United States Patent [19]
Kinumaki et al.

[11] 4,294,856
[45] Oct. 13, 1981

[54] PROCESS FOR MANUFACTURE OF ARTIFICIAL MILK REPLACER FOR RAISING INFANT PIGS AND OTHER INFANT ANIMALS

[75] Inventors: Toyosuke Kinumaki; Takehiko Watanabe, both of Yokohamashi; Kisaburo Sugii, Hasudashi; Shigeo Iseki, Tokyoto, all of Japan

[73] Assignee: Tokai Regional Fisheries Research Laboratory, Tokyo, Japan

[21] Appl. No.: 759,491

[22] Filed: Jan. 4, 1977

[51] Int. Cl.³ .............................................. A23L 1/33
[52] U.S. Cl. ....................................... 426/7; 426/643; 426/805
[58] Field of Search .................. 426/55, 56, 643, 646, 426/805, 7

[56] References Cited
U.S. PATENT DOCUMENTS 3,293,140  12/1966  Henry .............................. 426/56 X
3,989,847  11/1976  Kurihara et al. ................. 426/55 X
4,016,295   4/1977  Burrows et al. ................. 426/56 X Primary Examiner—Robert J. Warden
Attorney, Agent, or Firm—Holman & Stern

[57] ABSTRACT

A process for manufacture of digestable artificial milk replacer effective for raising infant pigs and other infant animals, comprising crushed meat and viscera of fishes and shell fishes are digested with protease, heated to inactivate the protease, separated the undigestable residue through a screen, the remaining solid matter is removed by means of centrifugation, minute suspended particles are removed by use of filter press, the solution is then defatted with solvent, reduced to a powder by means of spray-drying and finally the dry powder thus obtained is used as main protein source of said milk replacer, prepared with the addition of suitable amounts of skimmed milk powder, glucose, soybean oil, small amount of sodium chloride, antibiotics, vitamins, minerals and others.

5 Claims, No Drawings

PROCESS FOR MANUFACTURE OF ARTIFICIAL MILK REPLACER FOR RAISING INFANT PIGS AND OTHER INFANT ANIMALS

The object of the present invention relates to a process for manufacture of artificial milk replacer, for raising infant pigs and other infant animals.

The present inventors have investigated on manufacture of artificial milk replacer for raising infant pigs and other infant animals, which can be used for said infant animals few days after their birth, and succeeded in obtaining such milk replacer, the process of which comprises meat and viscera of fishes and shell fishes were digested with protease, defatted after removing the undigested residue, solid and minute suspended particles, and then reduced to a powder by means of spray-drying, after concentrating clear liquid thus obtained. (Said pulverized material is abbreviated as liquified protein.)

The inventors have studied to prepare an artificial milk replacer for infant pigs and calves and other infant animals, by addition to the liquified protein powder, suitable amounts of skimmed milk powder, glucose, soybean oil, small quantity of sodium chloride, antibiotics, vitamins, minerals etc.

By this process, the inventors succeeded in manfacturing an artificial milk replacer for raising infant pigs and other infant animals which have better nutritive value than that either skimmed milk powder or soybean protein etc.

The effects of the present invention explained by the experimental data and the examples of the use are as follows:

EXPERIMENT

Feeding infant pigs with liquified protein (BNP) made from Alaska pollack.

EXPERIMENTAL DATA

In order to examine the possibility of the use of liquified fish protein as a substitute of skimmed milk powder, the inventors carried out animal feeding test etc., by the use of infant pigs.

The results of experiments are as follows:

(1) Two kinds of artificial milk replacers which are compounded of skimmed milk powder as the only protein source and the other was of the mixture of skimmed milk powder and liquified fish protein from Alaska pollack, as protein source, (containing 15% of liquified fish protein to the pulverized milk replacer) were supplied to infant pigs from five days to three weeks old.

According to the result of experiments, the growth of the group of animals fed on the milk replacer containing liquified fish protein made from Alaska pollack was decidedly superior to the group fed on skimmed milk. And the same tendency was observed in feed intake and feed demand of pigs of both groups.

(2) The digestibility of crude protein was 93.85% in the case of skimmed milk and was 97.76% in the case of liquified fish protein from Alaska pollack.

(3) After the end of the experiments above mentioned, parts of infant pigs tested were killed and the main viscera and others were observed.

The symptoms indicated the existence of erosive ulcers in the stomach of some pigs fed on liquified fish protein, but the degree of ulceration was not so severe to have influence on the growth of pigs.

The result of experiments mentioned above shows that to substitute liquified fish protein for skimmed milk is quite within the bounds of possibility.

1. In the experiments mentioned above, the possibility to substitute liquified protein from Alaska pollack for skimmed milk was examined by the growth test on infant pigs. The reason why the infant pigs were selected as test animals is as follows:

In Japan, skimmed milk is usually used for the milk replacer for infant calves and infant pigs, and the pigs are more suitable for the experimental conditions and are easily obtainable than infant calves.

In addition, milk replacer for infant pigs, practically called the artificial milk and usually supplied to infant pigs after 20th day from their birth. However, in this experiment, to examine the nutritive value of liquified fish protein more severely, growth and digestibility tests were carried out by the use of infant pigs of 5 days old, in which the secretion of digestive enzyme are insufficient.

2. Materials and methods used (1) The sample used:

The sample of liquified fish protein used was prepared from Alaska pollack in Tokai Regional Fisheries Research Laboratory. The crude protein content of the sample was 89.44%.

(2) Infant pigs used:

Six $F_1$ hybrid pigs 5 days old (Landrace $\times$ Hampshire, abbreviated as $L \times H$ hereinafter) were used in each test group.

(3) Experimental period:

The experiments were carried out for 3 weeks from 5th day after the birth of the test animals.

(4) Milk replacer fed:

Two kinds of milk replacers shown in table 1 were fed to animals in two experimental groups, respectively.

TABLE 1

| Composition of milk replacers (%) | | |
|---|---|---|
| | Group 1 | Group 2 |
| Liquified fish protein from Alaska pollack | — | 15 |
| Skimmed milk powder | 68 | 34 |
| Lactose | — | 19 |
| Glucose | 25.9 | 25.9 |
| Soybean oil[1] | 5 | 5 |
| Sodium chloride | 0.3 | 0.3 |
| Chromium oxide | 0.1 | 0.1 |
| Other ingredient[2] | 0.7 | 0.7 |
| Total | 100 | 100 |
| Crude protein content | 22.43 | 24.68 |

Notes:
[1] 0.02% of BHT was added to the oil. BHT is an antioxydant permitted as feed additives and is added to prevent the oxidation of fats, vitamins etc.
[2] Antibiotics, trace elements, vitamins etc.

(5) Feeding method of milk replacer and other treatments

During 16 days from the start of the experiments, each group of infant pigs was contained in a battery with two stories electrically heated (1.76 m wide $\times$ 0.85 m deep $\times$ 0.52 m high for each room space, wire-netting floor) and was fed on the mixture of one part of milk replacer and 2~4 parts of warm water.

On and after 17th day from the start of the experiment, those infant pigs were kept in a cage with concrete floor, 3.6 m $\times$ 2.7 m, provided with a container warmed with an infrared lamp and fed on dry powder of milk replacer.

And in order to prevent the deficiency of trace element, the mixture shown in appended table 1 was dissolved as 1.25% in warm water and fed to the test animals.

3. Result of experiment
(1) Result of raising

TABLE 2

| | | Growth | | | |
|---|---|---|---|---|---|
| | | Body weight (Kg) | | | |
| Group | Items Number of pig [1] | At the start | A week after | Two weeks after | Three weeks after [2] | Weight gain (Kg) |
| Group 1 | 101 | 2.9 | 3.1 | 3.8 | 4.7 | 1.8 |
| | 102 | 3.5 | 4.0 | 5.0 | 6.1 | 2.6 |
| | 111 | 3.4 | 3.7 | 5.0 | 5.7 | 2.3 |
| | 112 | 3.7 | 4.0 | 5.3 | 6.4 | 2.7 |
| | 201 | 3.9 | 4.8 | 6.6 | 8.0 | 4.1 |
| | 211 | 2.6 | 3.6 | 4.3 | 5.4 | 2.8 |
| | Average | 3.33 | 3.87 | 5.00 | 6.05 | 2.72 |
| Group 2 | 103 | 3.4 | 3.9 | 5.5 | 7.1 | 3.7 |
| | 113 | 3.3 | 4.2 | 5.7 | 6.9 | 3.6 |
| | 114 | 3.3 | 4.1 | 5.5 | 6.3 | 3.0 |
| | 115 | 3.6 | 4.5 | 6.3 | 7.4 | 3.8 |
| | 202 | 3.8 | 4.7 | 6.8 | 8.8 | 5.0 |
| | 212 | 2.5 | 3.0 | 4.4 | 5.7 | 3.2 |
| | Average | 3.32 | 4.07 | 5.70 | 7.03 | 3.72* |

Notes:
[1]Numer of pig - Figure in the first place indicates the number of mother pig, 0 and 1 in the second place, ♀ and ♂, respectively and the figure in the third place, the number of infant pig.
[2]Body weight at 20th day after the birth Appended TABLE 1

| Composition of the mixture fed as 1.25% to warm water | |
|---|---|
| Iron (Ammonium iron citrate) | 11.4 g |
| Copper (Copper sulfate) | 485 mg |
| Vitamin A | 1,200,000 IU |
| Vitamin D$_3$ | 440,000 IU |
| Tocopheryl acetate | 650 mg |
| Menadione hydrogen sodium bisulfate | 950 mg |
| Vitamin B$_1$ | 440 mg |
| Vitamin B$_2$ | 1.3 g |
| Vitamin B$_{12}$ | 6.6 mg |
| Fradiomycin sulfate | 11.0 gU |
| Sodium benzoate | 0.85 g |
| Methyl para-hydroxybenzoate | 1.6 g |
| Sodium propionate | 3.2 g |
| Sodium hydrogen sulfite | 4.3 g |
| Dextrin | 8.2 g |
| Glucose | + |
| Total | 1,000 g |

Appended TABLE 2

| | Feed intake on dry basis and water intake in cc. | | | |
|---|---|---|---|---|
| Days after the start of the experiment | Feed intake (Milk replacer) | | Water intake | |
| | Group 1 | Group 2 | Group 1 | Group 2 |
| 1 | 20 g | 20 g | 413 cc | 413 cc |
| 2 | 50 | 50 | 865 | 850 |
| 3 | 90 | 90 | 877 | 618 |
| 4 | 120 | 120 | 880 | 897 |
| 5 | 109 | 140 | 1029 | 994 |
| 6 | 120 | 142 | 797 | 835 |
| 7 | 99 | 140 | 714 | 855 |

Appended TABLE 2-continued

| | Feed intake on dry basis and water intake in cc. | | | |
|---|---|---|---|---|
| Days after the start of the experiment | Feed intake (Milk replacer) | | Water intake | |
| | Group 1 | Group 2 | Group 1 | Group 2 |
| 8 | 119 | 148 | 976 | 1093 |
| 9 | 140 | 160 | 680 | 987 |
| 10 | 160 | 160 | 953 | 987 |
| 11 | 160 | 160 | 1237 | 1303 |
| 12 | 200 | 200 | 1717 | 1850 |
| 13 | 283 | 283 | 1584 | 1767 |
| 14 | 333 | 333 | 1617 | 1584 |
| 15 | 372 | 394 | 1678 | 1656 |
| 16 | 500 | 542 | 1492 | 1417 |
| 17 | 367 | 450 | 1216 | 1025 |
| 18 | 350 | 617 | 1147 | 1167 |
| 19 | 467 | 650 | 1325 | 1327 |
| 20 | 400 | 783 | 1725 | 1433 |
| 21 | 533 | 650 | 1850 | 1833 |
| Total | 4992 | 6232 | 24772 | 24891 |

TABLE 3

| | Intake of milk replacer on dry basis and feed demand ratio | | | | | |
|---|---|---|---|---|---|---|
| | Feed intake (g) | | | | Feed demand ratio | Water intake |
| | First week | Second week | Third week | Total | | |
| Group 1 | 608 | 1395 | 2989 | 4992 (100) | 1.84 | 24.8 l |
| Group 2 | 702 | 1444 | 4086 | 6232 (125) | 1.68 | 24.9 |

Note:
[1]Parenthesized figure indicates the index of feed intake.
[2]Intake of the mixture shown in appended table 1
Group 1 : 249 g
Group 2 : 248 g

TABLE 4

| | Occurrence of diarrhoea (Total number of days) | | | |
|---|---|---|---|---|
| | Loose feces | Muddy feces | Watery feces | Total |
| Group 1 | 3 | 7 | 7 | 17 |
| Group 2 | 4 | 4 | 5 | 13 |

The group of infant pigs in the both groups showed the excellent results.

Thus, as the body weight at the 25th day after the birth of infant pigs of same hybrid (L×H) fed on mother's milk is usually 5 Kg.

Therefore, the growth of infant pigs fed on milk replacer of the present invention is supposed to be better than that of the pigs fed on mother's milk.

Comparing the growth of infant pigs in group 2 with the growth of group 1, the weight gain of pigs of group 2 was obviously better than that in group 1 and the difference in these weight gains was significant.

Moreover, the group 2 showed the better results in feed intake (preference) and feed demand ratio.

On the tendency of occurrence of diarrhoea, group 1 showed less diarrhoea than group 2. No other symptom of disease specified was observed in the pigs of both groups.

Appended TABLE 3

| | | Frequency and degree of diarrhoea of individual infant pigs | | | | | | | | |
|---|---|---|---|---|---|---|---|---|---|---|
| | | Days after the start | | | | | | | | |
| Group | Pig No. | 4 | 5 | 6 | 7 | 17 | 18 | 19 | 20 | 21 | Total |
| Group 1 | 101 | | ⊕ | | | | | | ⊕ | ⊕ | 3 |

Appended TABLE 3-continued

| | | Frequency and degree of diarrhoea of individual infant pigs | | | | | | | | |
|---|---|---|---|---|---|---|---|---|---|---|
| | | Days after the start | | | | | | | | |
| Group | Pig No. | 4 | 5 | 6 | 7 | 17 | 18 | 19 | 20 | 21 | Total |
| | 102 | | | | | | | | | | 0 |
| | 111 | # | | | | # | | ## | + | # | 5 |
| | 112 | ## | ## | ## | # | | | ## | + | # | 7 |
| | 201 | | | | | | | | | | 0 |
| | 211 | | # | ## | | | | | | | 2 |
| | Total | 2 | 3 | 2 | 1 | 1 | | 2 | 3 | 3 | 17 |
| Group 2 | 103 | | | # | | | | | | | 1 |
| | 113 | | | | | # | | + | ## | + | 4 |
| | 114 | | | ## | ## | | | # | | | 3 |
| | 115 | | | | | | | | | + | 1 |
| | 202 | | | | | | | | | | 0 |
| | 212 | | ## | # | | | # | | | + | 4 |
| | Total | 1 | 1 | 3 | 1 | 1 | 1 | 2 | 1 | 3 | 13 |

Note:
+ Loose feces
++ Muddy feces
+++ Watery feces

Appended Table 4

Digestibility of crude protein in individual pigs

| Pig No. | Crude protein digestibility of the feed of group 1① | Pig No. | Crude protein digestibility of the feed of group 2 | Digestibility of crude protein of liquified fish protein |
|---|---|---|---|---|
| 101 | 91.70% | 103 | 95.28% | 96.86% |
| 102 | 93.71 | 113 | 94.65 | 95.67 |
| 111 | 94.76 | 114 | 94.70 | 95.58 |
| 112 | 94.47 | 115 | 97.22 | 100 |
| 201 | 93.83 | 202 | 97.17 | 100 |
| 211 | 94.61 | 212 | 96.15 | 98.43 |
| Average | 93.85 | Average | 95.86 | 97.76 |

Note:
①Digestibility of crude protein of skimmed milk powder (2) Result of experiment on digestion of the feed

TABLE 5

| | Digestibilities etc. | |
|---|---|---|
| | Average digestibility of crude protein | Percentage of digestable crude protein |
| Liquified fish protein from Alaska pollack | 97.76% | 87.45% |
| Skimmed milk powder | 93.85 | 30.96 |

From sixth day after the start of the experiment, feces of pigs were collected and the experiment on the digestion of the feed was carried out according to the indication method.

By the result, the digestibilities of crude protein were 93.85% in the case of skimmed milk powder and 97.76% in the case of liquified fish protein from Alaska pollack, respectively.

(3) Anatomical symptoms

After the end of the experiments, a part of pigs used was killed and observation was performed mainly on digestive tract of the animals.

In the result of the experiment, an edema as large as the tip of a little finger was seen in the tunic of kidney of Pig No. 101 in group 1, erosive ulcers were observed in several places of greater curvature of the stomach of Pig No. 103 in group 2 and slight erosion was seen in the mucous membrane of the stomach of Pig No. 202.

On the visceral weight of pigs, spleens of the animals in group 2 were heavier than those in group 1.

The anatomical symptoms were as mentioned above, but the growth of infant pigs were good in spite of the symptoms. Therefore, it seems that the matter is considered beyond dispute.

TABLE 6

| | Weight ratio of viscera to body weight | | | | | | | |
|---|---|---|---|---|---|---|---|---|
| | Liver | Kidneys | Heart | Spleen | Pancreas | Stomach | Small intestine | Lung |
| Group 1 | 3.52 | 0.74 | 0.70 | 0.28 | 0.28 | 0.89 | 6.09 | 1.29 |
| Group 2 | 3.62 | 0.79 | 0.71 | 0.38* | 0.23 | 0.77 | 5.39 | 1.27 |

As stated above, the milk replacer, produced by the process of the present invention, indicates, as stated above, the excellent effect was taken when the milk replacer was fed to infant pigs from the 5th day after their birth.

Experiment relates to feeding on liquified fish protein to infant pigs.

SUMMARY OF THE RESULTS

Feeding experiments were carried out, using infant pigs, to examine the possibility to substitute liquified fish protein for skimmed milk.

The results of experiments are as follows:

(1) Two kinds of milk replacers, consisting of skimmed milk as the only protein source and of the mixture of skimmed milk and liquified fish protein (containing 15% of the liquified fish protein) were fed to the infant pigs of 5 days old for 16 days.

The results of experiments showed no significant difference of growth between the test groups, but better tendency on feed demand ratio was observed in pigs fed on liquified fish protein.

(2) The digestibility of crude protein was 94.96% in the case of skimmed milk and was 95.93% in the case of liquified fish protein, respectively.

According to the results of the experiment mentioned above, it can be concluded that the substitution of liquified fish protein of the present invention for skimmed milk has good possibility.

1. Materials and methods used (1) The sample used

Liquified fish protein (crude protein: 84.95%) offered by Tokai Regional Fisheries Research Laboratory was used.

(2) Infant pigs used

Six infant pigs of 5 days old of $F_1$ hybrid (L×H) were used in each group.

(3) Experimental period

The experiments were carried out for 16 days from 5th day after the birth.

(4) Milk replacer used

TABLE 7

| Composition of milk replacer (%) | | |
|---|---|---|
| | Group 1 | Group 2 |
| Liquified protein | — | 15 |
| Skimmed milk powder | 68 | 34 |
| Lactose | — | 19 |
| Glucose | 25.9 | 25.9 |
| Soybean oil① | 5 | 5 |
| Sodium chloride | 0.3 | 0.3 |
| Chromium oxide | 0.1 | 0.1 |
| Other ingredient② | 0.7 | 0.7 |
| Total | 100 | 100 |
| Crude protein content | 23.80 | 25.32 |

Note:
①0.02% of BHT was added.
②Antibiotics, trace elements, vitamins, etc.

Infant pigs were divided into 2 groups and fed on milk replacer shown in table 7.

(5) Methods of feeding milk replacers etc.

All infant pigs used in the experiments were contained in a battery of two stories with an electrical heating equipment (1.76 m wide×0.85 m deep×0.52 m high) with wire netting floor during the period of the experiment, and were fed on the mixture of a part milk replacer and 2~4 parts of warm water.

To prevent deficiency of trace elements, D-1 (trade name of a feed additive) shown in the appended table 5 was fed as 1.25% solution with warm water.

2. Results of experiments (1) Results in the feeding experiments

The results of the experiments were shown in the tables 2 and 3.

The infant pigs in both groups showed almost similar growth to infant pigs fed on mother's milk. Thus, the body weight of infant pigs (L×H) were about 5 Kg at the 25th day after their birth and the body weight of infant pigs at the 15th day after their birth, as shown in the appended table 6, would gain more than 600 g at the 25th day after their birth, the growth of infant pigs in the present experiments seemed to be the same order in the pigs fed on mother's milk.

The intake of milk replacer of infant pigs in both groups 1 and 2 were fairly good.

The feed demand ratio of the pigs in the group 1 was better than that in the group 2.

Considering the health condition of the test animals, watery diarrhoea were often observed in the pigs of groups within 4~9 days from the start of the experiment and the suitable medical treatments to cure the symptoms were applied.

TABLE 8

| | Weight gain etc. | | | |
|---|---|---|---|---|
| | Weight gain (index) | Intake of milk replacer | Feed demand ratio | Intake of water |
| Group 1 | 1.88 (100) g(%) | 2.64 Kg | 1.40 | 16.2 l |
| Group 2 | 217 (115) | 2.56 | 1.18 | 16.7 |

Note:
Intake of D-1
in group 1: 98g
in group 2: 113g

TABLE 9

| | Occurrence of diarrhoea (Total number of days) | | | |
|---|---|---|---|---|
| | Loose feces | Muddy feces | Watery feces | Total |
| Group 1 | 5 | 6 | 2 | 13 |
| Group 2 | 5 | 8 | 24 | 37 |

The frequent occurrence of diarrhoea in the pigs in group 2 seemed to have not so significant effect on the growth of the animals and in the case of weaning at 5th day after the birth, the frequent diarrhoea were observed from the third day after the administration of milk replacer.

Therefore, it is difficult to conclude by the results in the present experiments that the diarrhoea observed were caused by the administration of milk replacer used.

(2) Results in the digestibility experiments

From the 5th day after the start of feeding milk replacer, feces were collected and the digestibility of protein was examined according to the indicator method. As shown in the table 10, liquified fish protein showed better digestibility than skimmed milk powder.

TABLE 10

| Digestibility of crude protein etc. | | |
|---|---|---|
| | Digestibility of crude protein | Digestable crude protein |
| Skimmed milk powder | 94.96% | 33.24% |
| Liquified fish protein | 95.93 | 81.49 |

Appended TABLE 5

| Composition of D-1 | |
|---|---|
| Iron (Ammonium iron citrate) | 11.4 g |
| Copper (Copper sulfate) | 485 mg |
| Vitamin A | 1,200,000 IU |
| Vitamin $D_3$ | 440,000 IU |
| Tocopheryl acetate | 650 mg |
| Menadione, sodium hydrogen bisulfite | 950 mg |
| Vitamin $B_1$ | 440 mg |
| Vitamin $B_2$ | 1.3 g |
| Vitamin $B_{12}$ | 6.6 mg |
| Fradiomycin sulfate | 11.0 g titer |
| Sodium benzoate | 0.85 g |
| Methyl parahydroxybenzoate | 1.6 g |
| Sodium propionate | 3.2 g |
| Sodium hydrogen sulfite | 4.3 g |
| Dextrin | 8.2 g |
| Glucose | + |
| Total | 1,000 g |

Note:
D-1 is prepared by Kumiai Kagaku Kabushiki Kaisha

Appended TABLE 6

| Group | Pig No. | Body weight (Kg) At the start | At 5th day | At 10th day | At 15th day[1] | Weight gain (Kg) |
|---|---|---|---|---|---|---|
| Group 1 | 111 | 2.0 | 2.6 | 2.7 | 3.8 | 1.8 |
|  | 112 | 2.0 | 2.5 | 2.9 | 3.5 | 1.5 |
|  | 201 | 3.4 | 3.5 | 4.3 | 5.3 | 1.9 |
|  | 211 | 3.4 | 3.6 | 4.3 | 5.9 | 2.5 |
|  | 212 | 3.5 | 3.7 | 4.4 | 5.4 | 1.9 |
|  | 213 | 3.1 | 3.2 | 3.5 | 4.8 | 1.7 |
|  | Average | 2.90 | 3.18 | 3.68 | 4.78 | 1.88(100) |
| Group 2 | 113 | 1.9 | 2.1 | 2.7 | 3.2 | 1.3 |
|  | 101 | 2.4 | 2.9 | 3.5 | 4.5 | 2.1 |
|  | 214 | 3.5 | 3.7 | 3.9 | 5.1 | 1.6 |
|  | 215 | 3.3 | 3.3 | 4.6 | 6.4 | 3.1 |
|  | 201 | 3.0 | 3.3 | 4.0 | 5.3 | 2.3 |
|  | 202 | 3.3 | 3.4 | 4.5 | 5.9 | 2.6 |
|  | Average | 2.90 | 3.12 | 3.87 | 5.07 | 2.17(115) |

Note:
[1] Body weight of infant pigs at the 21st day after their birth
[2] The figures in the first place indicate No. of mother pig, 0 in the second place indicates male, and 1 in the second place indicates female, the figures in the third place indicate numbers of infant pigs.
[3] Parenthesized figure in the weight gain column indicates index.

APPENDED TABLE 7

Intake of milk replacer and water

| Days after the start of the experiment | Milk replacer Group 1 | Group 2 | Intake of water Group 1 | Group 2 |
|---|---|---|---|---|
| 1[1] | 4 g | 2 g | 254 cc | 331 cc |
| 2 | 50 | 50 | 533 | 533 |
| 3 | 90 | 90 | 610 | 860 |
| 4 | 120 | 120 | 630 | 797 |
| 5 | 120 | 97 | 628 | 825 |
| 6 | 113 | 90 | 818 | 643 |
| 7 | 129 | 120 [2] | 783 | 780 |
| 8 | 147 | 128 | 1020 | 962 |
| 9 | 160 | 160 | 820 | 820 |
| 10 | 160 | 160 | 820 | 820 |
| 11 | 160 | 160 | 1270 | 1320 |
| 12 | 190 | 190 | 1463 | 1380 |
| 13 | 260 | 260 | 1703 | 1670 |
| 14 | 333 | 333 | 1825 | 1908 |
| 15 | 400 | 400 | 2315 | 2348 |
| 16[1] | 200 | 200 | 683 | 683 |
| Total | 2636 | 2560 | 16175 | 16680 |

Note:
[1] The feed intake in the first day was calculated as the quantity of the period from 0 pm to 5 pm and the feed intake in the 16th day as the quantity from 5 pm of the day before to 0 pm, and those in other days as the quantities for 24 hours from 5 pm of the day before.
[2] Administration of the milk replacer was restricted by the cause of the frequent occurrence of diarrhoea.

Appended TABLE 8

Frequency and degree of diarrhoea of individual infant pigs

| | Pig No. | 4 | 5 | 6 | 7 | 8 | 9 | 10 | 12 | 13 | 14 | Total |
|---|---|---|---|---|---|---|---|---|---|---|---|---|
| Group 1 | 111[1] |  |  |  |  |  |  |  |  |  |  |  |
|  | 112 | ☰ |  | + | ☰ | ☰ |  |  |  |  |  | 4 |
|  | 201 |  |  | ☰ | ☰ | + |  |  |  |  |  | 3 |
|  | 211 |  | + | ☰ | ☰ |  |  |  |  |  |  | 3 |
|  | 212 | ☰ | + | + |  |  |  |  |  |  |  | 3 |
|  | 213 |  |  |  |  |  |  |  |  |  |  |  |
|  | Total | 2 | 2 | 4 | 3 | 2 |  |  |  |  |  | 13 |
| Group 2 | 113 |  | ☰ | ☰ | ☰ | ☰ | ☰ | ☰ |  |  |  | 6 |
|  | 101 | ☰ | ☰ | ☰ | ☰ | ☰ | ☰ | + | + | ☰ | ☰ | 10 |
|  | 214 |  |  | + | ☰ | ☰ |  |  |  |  |  | 3 |
|  | 215 | ☰ | ☰ | ☰ | ☰ | ☰ |  |  |  |  | ☰ | 6 |
|  | 201 | ☰ | ☰ | ☰ | ☰ | ☰ | + |  |  |  |  | 6 |
|  | 202 | ☰ | ☰ | ☰ | ☰ | + |  |  |  |  |  | 6 |
|  | Total | 4 | 5 | 6 | 6 | 6 | 4 | 2 | 1 | 1 | 2 | 37 |

[1] No. of pig
[2] + Loose feces, ⊹ Muddy feces, ☰ Watery feces

Appended TABLE 9

Individual digestibility of crude protein in the infant pigs

| No. of pigs | Digestibility of crude protein fed with liquified fish protein | Digestable crude protein |
|---|---|---|
| 113 | 95.21% | 80.87% |
| 101 | excluded | excluded |
| 214 | 95.13 | 80.81 |
| 215 | 94.27 | 80.08 |
| 201 | 97.65 | 82.95 |
| 202 | 97.41 | 82.75 |
| Average | 95.93 | 81.49 |

Appended TABLE 10

Digestibilities of crude protein of the different feeds in two groups

| | Number of pigs | Digestibility of crude protein |
|---|---|---|
| Group 1[1] | 111 | 95.69% |
|  | 112 | 95.89 |
|  | 201 | 95.68 |
|  | 211 | 93.36 |
|  | 212 | 94.55 |
|  | 213 | 94.58 |
|  | Average | 94.96 |
| Group 2 | 113 | 94.92 |
|  | 101 | (89.81)[2] |
|  | 214 | 94.86 |
|  | 215 | 94.45 |
|  | 201 | 96.14 |
|  | 202 | 96.02 |
|  | Average | 95.28 |

Note:
[1] Digestibility of skimmed milk
[2] Excluded as an extraordinary experimental value

Digestibility test on rats with condensed protein hydrolysate from Antarctic krill

SUMMARY OF EXPERIMENTS

The digestibility test of condensed protein hydrolysate from Antarctic krill was carried out by the use of rats. The results were as follows:

Digestibility of crude protein and digestable protein content were 87.33% and 63.58%, respectively and energy digestibility and digestable energy were 93.33% and 34.34 Kcal/kg, respectively.

These values of the protein seemed to be better compared with those of average feeding stuffs used in Japan.

1. Materials and methods used
    (1) The sample used

Liquified fish protein powder from Antarctic krill offered by Tokai Regional Fisheries Research Laboratory was used in the experiments.

Crude protein of said powder was 72.81% and total energy was 3680 Kcal/kg.

(2) Rats used

Two adult male rats were contained in each one cage used for the metabolic experiments, and each feeding material was given to six groups of rats.

(3) Feeding material used

As test diet, the mixture of 70 parts of a commercial artificial milk for infant pigs which was basal diet, the mixture of 70 parts of above basal diet and 30 parts of the liquified fish protein offered.

(4) Collecting method of feces etc.

Experiments on the digestibility were carried out according to the method using total feces secreted.

Thus, the accurate amounts of feed intake were measured and total feces within 11 days from the 7th day after the start of feeding were collected.

The total quantity of feces was accurately measured and feces were analysed after drying.

2. Result of the experiments

TABLE 11

Digestibility of crude protein etc.

| | Crude Protein | | Energy | |
|---|---|---|---|---|
| Group | Digestibility | Digestable crude protein | Digestibility | Digestable energy Kcal/kg |
| 2 - 1 | 86.86% | 63.24% | 91.09% | 3352.11 |
| 2 - 2 | 86.77 | 63.18 | 92.66 | 3409.89 |
| 2 - 3 | 87.23 | 63.51 | 93.30 | 3433.44 |
| 2 - 4 | 86.22 | 62.78 | 93.98 | 3458.46 |
| 2 - 5 | 88.00 | 64.07 | 94.69 | 3484.59 |
| 2 - 6 | 88.87 | 64.71 | 94.25 | 3468.40 |
| Average | 87.33 | 63.58 | 93.33 | 3434.48 |

The digestibilities of both crude protein and energy were good as shown in table 11.

Appended TABLE 11

Feed intake etc.

| | | Feed intake | | Feces secreted | | |
|---|---|---|---|---|---|---|
| Section | Group | Total intake | Intake per capita per day | Total quantity | Quantity per capita per day | Total quantity of feces per 100g of feed taken |
| Section 1 | 1 - 1 | 542g | 24.64 g | 65.75g | 2.99 g | 12.13 g |
| | 1 - 2 | 558 | 25.36 | 70.20 | 3.19 | 12.58 |
| | 1 - 3 | 566 | 25.73 | 73.34 | 3.33 | 12.96 |
| | 1 - 4 | 490 | 22.27 | 42.60 | 1.94 | 8.69 |
| | 1 - 5 | 484 | 22.00 | 65.65 | 2.98 | 13.56 |
| | 1 - 6 | 500 | 22.73 | 68.41 | 3.11 | 13.68 |
| | Average | | | | | |
| Section 2 | 2 - 1 | 566 | 25.73 | 67.75 | 3.08 | 11.97 |
| | 2 - 2 | 500 | 22.73 | 57.34 | 2.61 | 11.47 |
| | 2 - 3 | 492 | 22.36 | 54.69 | 2.49 | 11.12 |
| | 2 - 4 | 566 | 25.73 | 63.86 | 2.90 | 11.28 |
| | 2 - 5 | 464 | 21.09 | 50.78 | 2.31 | 10.94 |
| | 2 - 6 | 568 | 25.82 | 59.82 | 2.72 | 10.53 |
| | Average | | | | | |

Note:
Two rats in each group and feces in 11 days were collected.

Appended TABLE 12

Analytical data of feed used etc.

| | Material used | Basal diet | Test diet |
|---|---|---|---|
| Crude protein % | 72.81 | 18.53 | 34.04 |
| Total energy Kcal/kg | 36.80 | 37.80 | 37.50 |

Appended TABLE 13

Digestibility of basal diet etc.

| | Crude protein | | Total energy | |
|---|---|---|---|---|
| Group | Digestibility | Digestable crude protein | Digestibility | Digestable energy Kcal/kg |
| 1 - 1 | 84.97% | 15.74% | 88.13% | 3331.31 |
| 1 - 2 | 82.72 | 15.34 | 87.42 | 3304.48 |
| 1 - 3 | 83.64 | 15.50 | 86.97 | 3287.47 |
| 1 - 4① | (88.83) | (16.46) | (91.16) | (3445.85) |
| 1 - 5 | 82.51 | 15.29 | 86.62 | 3274.24 |
| 1 - 6 | 82.97 | 15.37 | 86.47 | 3268.57 |
| Average | 83.36 | 15.45 | 87.12 | 3293.14 |

Note:
① Excluded as extraordinary value

Appended TABLE 14

Digestibility of test diet etc.

| | Crude protein | | Total energy | |
|---|---|---|---|---|
| Group | Digestibility | Digestable crude protein | Digestibility | Digestable energy Kcal/kg |
| 2 - 1 | 87.49% | 29.78% | 88.29% | 3310.88 |
| 2 - 2 | 87.44 | 29.76 | 88.75 | 3328.13 |
| 2 - 3 | 87.71 | 29.86 | 88.94 | 3335.25 |
| 2 - 4 | 87.08 | 29.64 | 89.14 | 3342.75 |
| 2 - 5 | 88.23 | 30.03 | 89.30 | 3350.63 |
| 2 - 6 | 88.78 | 30.22 | 89.22 | 3345.75 |
| Average | 87.79 | 29.88 | 88.95 | 3335.57 |

Acceptability test of artificial milk replacer of the present invention for calves Artificial milk replacer containing 10% of liquified fish protein powder of the present invention (other ingredients were the same as the milk replacer used for experiments on infant pigs mentioned above) was used to examine the acceptability of calves for the milk replacer.

Three infant calves were used. During two weeks after their birth, mother's milk was given, and after two weeks of their birth, the milk replacer of the present invention, containing 10% of liquified fish protein powder, was fed freely, once in the morning and once in the evening. The result indicated that the calves took above milk replacer without any trouble and no extraordinary symptoms were observed on the secretion of feces.

EXAMPLE 1

100 fresh mackerel with viscera weighing 54.4 Kg was crushed by the use of a meat chopper, 52.3 Kg of chopped material was obtained. The material was transferred into a digestion tank of the capacity of 150 l with stirring facility. And then 150 g of commercial bacterial protease BNP (trade name 100,000 Unit/g prepared by Godo Shusei Co. Ltd.) was added after dissolving it in 50 l of water, and the mixture was digested for 4 hours at 45°–50° C.

After the digestion was finished, the digested material was heated at 90° C. for 10 minutes to inactivate protease added. And then said heated material was filtered through a screen of 30 mesh to remove the coarse residue, almost consisting of bones (325 g of dry basis).

The filtrate was centrifuged by the use of Sharples type separator with 15,000 rpm to remove solid and clear filtrate of 81 Kg was obtained after removing minute suspended solid by the use of a filter press by use of celite as filter aid. The solution thus obtained was put in a tank of the capacity of 150 l and then extracted twice with each 25 Kg of cyclohexane and then once with 12.5 Kg of cyclohexane with stirring and defatted.

The defatted liquid of 79.4 Kg was transferred into vacuum condenser of De Laval Centritherm type and concentrated to be 37.2 Kg at 37° C. of distillating temperature under vacuum of 20–30 mmHg and the heating temperature of 70° C.

The concentrated liquid thus obtained was spray-dried for 2 hours at 160° C. of heating temperature and 85° C. of exhaust air temperature with stirring of 15,000 rpm of the atomizer in Swainson type spray dryer and 5.1 Kg of dried powder was obtained.

The analytical data of each process of the operation and the final product are as follows:

| Material | Moisture % | Crude protein % | Crude ash % | Crude fat % |
| --- | --- | --- | --- | --- |
| Chopped mackerel | 75.5 | 17.0 | 3.0 | 4.5 |
| Digested liquid | 92.0 | 7.0 | 0.6 | 0.08 |
| Residue | 65.0 | 22.0 | 2.0 | 10.0 |
| Defatted liquid | 92.0 | 7.0 | 0.6 | 0.03 |
| Condensed liquid | 80.0 | 18.0 | 1.4 | — |
| Liquified fish protein powder | 4.0 | 88.0 | 7.9 | 0.1 |

Composition of amino acids are as follows.

| Composition of amino acids of liquified fish protein * NH3 is not included in the total. | | | | |
| --- | --- | --- | --- | --- |
| | Total amino acids | | Free amino acids | | Percent of free amino acids |
| | mg/g | * % | mg/g | * % | % |
| Tryptophan | 6.60 | 0.95 | 5.53 | 1.79 | 84.0 |
| Lysine | 38.38 | 5.50 | 20.41 | 6.61 | 53.3 |
| Histidine | 38.32 | 5.49 | 25.53 | 8.27 | 66.6 |
| Ammonium | 11.31 | — | 5.82 | — | 52.3 |
| Arginine | 29.99 | 4.29 | 15.05 | 4.87 | 50.2 |
| Aspartic acid | 62.08 | 8.89 | 5.58 | 1.81 | 9.0 |
| Threonine | 28.52 | 4.08 | 14.85 | 4.81 | 52.6 |
| Serine | 27.31 | 3.91 | 6.65 | 2.15 | 24.4 |
| Glutamic acid | 102.52 | 14.68 | 20.32 | 6.58 | 19.8 |
| Proline | 37.51 | 5.37 | 10.43 | 3.38 | 27.9 |
| Glycine | 58.00 | 8.30 | 9.51 | 3.08 | 16.8 |
| Alanine | 55.69 | 7.97 | 25.56 | 3.28 | 46.0 |
| Cystine | 6.14 | 0.88 | 5.76 | 1.87 | 94.0 |
| Valine | 43.20 | 6.19 | 23.97 | 7.76 | 55.6 |
| Methionine | 19.19 | 2.75 | 16.12 | 5.22 | 82.0 |
| Isoleucine | 36.34 | 5.20 | 21.64 | 7.02 | 59.7 |
| Leucine | 61.13 | 8.75 | 47.03 | 15.25 | 77.3 |
| Tyrosine | 19.48 | 2.79 | 12.58 | 4.08 | 64.5 |
| Phenylalanine | 28.04 | 4.01 | 22.19 | 7.19 | 79.2 |
| Total | 698.44 | 100.00 | 308.75 | 100.00 | 44.2 |

The milk replacer was prepared by mixing 49 parts (in weight) of liquified fish protein mentioned above, 19 parts of lactose, 25.9 parts of glucose, 5 parts of soybean oil, 0.3 part of sodium chloride, 0.1 part of chromium oxide, and 0.7 part of others (antibiotics, trace element, vitamins).

EXAMPLE 2

20 Kg of frozen Antarctic krill preserved for six months at −20° C. was finely crushed by the use of a chopper, and 19.4 Kg of crushed material was obtained. This crushed material was put in a digestion tank and digested at 45° C. for 3 hours with stirring by the use of 40 g of a commercial bacterial protease (BNP trade name offered by Godo Shusei Co. Ltd., 70,000 Unit/g) dissolving in 20 l of water with continuous stirring. After the digestion was completed, the hydrolysate was heated at 90° C. for 10 minutes to inactivate the protease. The slung was centrifuged by the use of a Sharples type separator to remove 6.5 Kg of the residue. The centrifuged liquid was filtered with addition of celite by means of filter press to remove minute suspended matter and 29 l of filtrate was obtained.

The filtrate thus obtained was put in a separation tank to extract fat, twice by continuous stirring with cyclohexanes as in example 1.

The defatted liquid was concentrated in a De Laval Centritherm type condenser under vacuum of 20–30 mmHg and condensed to 12.3 l.

The concentrated liquid was spray-dried at the heating temperature of 130°–135° C. and exhaust air temperature of 76°–78° C. By these treatments 2.0 Kg of liquified fish protein powder was obtained from Antarctic krill.

Analytical data in each step of the operation and of the final product are as follows:

| Sample | Moisture % | Crude protein % | Crude ash % | Crude fat % |
| --- | --- | --- | --- | --- |
| Crushed krill | 82.11 | 11.91 | 3.28 | 1.27 |
| Centrifuged liquid | 92.37 | 5.78 | 1.01 | 0.02 |
| Residue | 66.67 | 11.85 | 7.46 | 13.75 |

| Sample | Moisture % | Crude protein % | Crude ash % | Crude fat % |
|---|---|---|---|---|
| Condensed liquid | 82.69 | 12.85 | 2.24 | 0.02 |
| Liquified fish protein powder | 5.42 | 71.08 | 13.27 | 0.08 |

Composition of amino acids are as follows:

Analysis of condensed krill protein hydrolysate

| | % of free amino acids | Amount of total amino acids mg/g | % of total amino acids |
|---|---|---|---|
| Tryptophan | 0.70 | 4.94 | 1.17 |
| Lysine | 12.56 | 44.32 | 10.51 |
| Histidine | 0.67 | 6.39 | 1.52 |
| Ammonium | 0.46 | 3.70 | 0.88 |
| Arginine | 10.25 | 33.30 | 7.90 |
| Aspartic acid | 3.51 | 40.97 | 9.72 |
| Threonine | 5.67 | 17.14 | 4.07 |
| Serine | 4.41 | 14.98 | 3.55 |
| Glutamic acid | 5.04 | 42.41 | 10.08 |
| Proline | 6.01 | 26.11 | 6.19 |
| Glicine | 9.01 | 40.90 | 9.70 |
| Alanine | 7.57 | 27.63 | 6.55 |
| Cystine | 1.09 | 5.58 | 1.32 |
| Valine | 6.69 | 23.57 | 5.59 |
| Methionine | 2.68 | 10.10 | 2.40 |
| Isoleucine | 5.88 | 21.64 | 5.13 |
| Leucine | 9.79 | 31.62 | 7.50 |
| Tyrocine | 2.80 | 9.26 | 2.20 |
| Phenylalanine | 5.21 | 17.02 | 4.04 |
| Total | 100.00 | 421.58 | 100.00 |

39 Parts (weight) of liquified fish protein powder mentioned above, 19 parts of lactose, 25.9 parts of glucose, 5 parts of soybean oil, 0.3 part of sodium chloride, 0.1 part of chromium oxide, and 0.7 part of other ingredients (a mixture of antibiotics, trace element and vitamins) were mixed to prepare milk replacer.

EXAMPLE 3

60.4 Kg of minced washed raw meat of Alaska pollack was put in a cooker and was digested at 40°–50° C. for 4 hours with 300 g of a commercial protease obtained from mould dissolving in 60 l of water. After the digestion was completed, the hydrolysate was heated at 90°–92° C. for 10 minutes to inactivate the protease. Then the digested liquid was separated from the residue at first by the gravitational filtration and then pressing through a polypropylene bag.

By the use of centrifugal separator solid matter was removed from the liquid as stated in example 1, and the liquid was filtered to remove minute suspended particles, by use of celite as filter aid, by means of filter press.

The clear liquid, obtained, was put in a separation tank to extract fat, by stirring, with cyclohexane.

After defatting, defatted liquid was condensed to 22.5 l and it was dried to the powder of 4.87 Kg by use of a spray-drier at 130°–135° C. The yield of this product was 8.02% to minced raw meat.

The milk replacer of the present invention was prepared by mixing 39 parts of liquified fish protein powder described above, 19 parts of lactose, 25.9 parts of glucose, 5 parts of soybean oil, 0.3 part of sodium chloride, 0.1 part of chromium oxide and 0.7 part of other ingredients (antibiotics, trace elements and vitamins).

What we claim:

1. A process for manufacturing artificial milk replacer for raising infant pigs and other infant animals comprising the steps of:
   crushing meat and viscera of fish and shell fish to form a pulp;
   digesting said pulp with protease;
   heating the digested pulp to inactivate the protease,
   removing the solid matter and suspended particles successively by screening, centrifuging, and filtering the digested pulp to obtain a liquid;
   defatting the liquid with solvent;
   condensing the defatted liquid; and
   reducing the condensed liquid to a powder by spray-drying.

2. The process of claim 1 comprising the further step of adding to the powder which forms the main protein source, skimmed milk powder, glucose, soybean oil, minor amounts of sodium chloride, antibiotics, vitamins, minerals and trace elements.

3. The process of claim 1 wherein the protease is bacterial protease, the digesting takes place at a temperature of from 40° to 50° C. for 4 hours, and the heating is to a temperature of approximately 90° to 92° C. for about 10 minutes.

4. The process for manufacture of artificial milk replacer for raising infant pigs and other infant animals as claimed in claim 1, wherein bacterial protease is used for the digestion of the meat and viscera of fish and shell fish.

5. The process for manufacture of artificial milk replacer for infant pigs and other infant animals as claimed in claim 1, wherein cyclohexane is used as the solvent.

* * * * *